(12) United States Patent
Lankoande et al.

(10) Patent No.: US 8,184,927 B2
(45) Date of Patent: *May 22, 2012

(54) SYSTEM AND METHOD FOR REDUCTION OF SPECKLE NOISE IN AN IMAGE

(75) Inventors: Ousseini Lankoande, Westfield, MA (US); Majeed M. Hayat, Albuquerque, NM (US); Balu Santhanam, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 519 days.

This patent is subject to a terminal disclaimer.

(21) Appl. No.: 12/406,730

(22) Filed: Mar. 18, 2009

(65) Prior Publication Data

US 2009/0175557 A1 Jul. 9, 2009

Related U.S. Application Data

(63) Continuation-in-part of application No. 11/831,353, filed on Jul. 31, 2007, now Pat. No. 7,961,975.

(51) Int. Cl.
*G06K 9/40* (2006.01)

(52) U.S. Cl. ............... 382/275; 382/260; 382/274

(58) Field of Classification Search ......... 382/128–134, 382/144, 173, 260–261, 274–275; 600/437, 600/443; 358/463
See application file for complete search history.

(56) References Cited

U.S. PATENT DOCUMENTS

| | | | |
|---|---|---|---|
| 4,887,306 A | 12/1989 | Hwang et al. | |
| 5,022,091 A | 6/1991 | Carlson | |
| 5,452,367 A * | 9/1995 | Bick et al. | 382/128 |
| 5,754,618 A | 5/1998 | Okamoto et al. | |
| 5,910,115 A * | 6/1999 | Rigby | 600/443 |
| 5,987,094 A * | 11/1999 | Clarke et al. | 378/62 |
| 6,071,240 A * | 6/2000 | Hall et al. | 600/443 |
| 6,155,978 A | 12/2000 | Cline et al. | |
| 6,322,509 B1 | 11/2001 | Pan et al. | |
| 6,636,645 B1 | 10/2003 | Yu et al. | |
| 6,753,965 B2 * | 6/2004 | Kumar et al. | 356/431 |
| 6,990,225 B2 | 1/2006 | Tanaka | |
| 6,990,627 B2 * | 1/2006 | Uesugi et al. | 714/794 |
| 7,520,857 B2 | 4/2009 | Chalana et al. | |
| 7,545,979 B2 * | 6/2009 | Fidrich et al. | 382/173 |
| 7,623,709 B2 * | 11/2009 | Gering | 382/173 |
| 7,636,455 B2 * | 12/2009 | Keaton et al. | 382/104 |
| 7,744,532 B2 * | 6/2010 | Ustuner et al. | 600/437 |
| 7,860,344 B1 * | 12/2010 | Fitzpatrick et al. | 382/291 |
| 7,921,717 B2 * | 4/2011 | Jackson et al. | 73/602 |

(Continued)

OTHER PUBLICATIONS

Kaan Ersahin, Image Segmentation Using Binary Tree Structured Markov Random Fields, Unknown Publisher, Dec. 19, 2004.

(Continued)

*Primary Examiner* — Kanjibhai Patel
(74) *Attorney, Agent, or Firm* — Schwegman, Lundberg & Woessner, P.A.

(57) ABSTRACT

The present invention includes methods for the reduction of speckle noise in an image and methods for segmenting an image. Each of the methods disclosed herein includes steps for analyzing the uniformity of a pixel within a plurality of pixels forming a portion of the image and, based on the uniformity of the intensity of the plurality of pixels, adjusting and/or replacing the pixel in order to produce a speckle-noise reduced image, a segmented image, or a segmented and speckle-noise reduced image. The methods of the present invention can employ for example conditional probability density functions, nonlinear estimator functions, convex energy functions and simulated annealing algorithms in the performance of their respective steps.

23 Claims, 9 Drawing Sheets

U.S. PATENT DOCUMENTS

| | | | |
|---|---|---|---|
| 7,961,975 | B2 | 6/2011 | Lankoande et al. |
| 7,983,486 | B2 * | 7/2011 | Zhou ............................. 382/190 |
| 8,050,498 | B2 * | 11/2011 | Wilensky et al. ............. 382/173 |
| 2003/0036703 | A1 | 2/2003 | Li |
| 2005/0134813 | A1 | 6/2005 | Yoshikawa et al. |
| 2008/0025619 | A1 | 1/2008 | Lankoande et al. |
| 2011/0229034 | A1 | 9/2011 | Lankoande et al. |

OTHER PUBLICATIONS

D. Gencaga, SAR Image Enhancement Using Particle Filters, Interactive Presentation, Oct. 1, 2005, Italy.

Hua Xie, SAR Speckle Reduction Using Wavelet Denoising and Markov Random Field Modelling, IEEE Transactions on Geoscience and Remote Sensing, vol. 40, No. 10, Oct. 2002.

"U.S. Appl. No. 11/831,353, Non Final Office Action mailed Oct. 31, 2010", 8 pgs.

"U.S. Appl. No. 11/831,353, Notice of Allowance mailed Feb. 7, 2011", 7 pgs.

"U.S. Appl. No. 11/831,353, Response filed Jan. 13, 2011 to Non Final Office Action mailed Oct. 13, 2010", 9 pgs.

"U.S. Appl. No. 11/831,353, Response filed Sep. 30, 2010 to Restriction Requirement mailed Sep. 1, 2010", 7 pgs.

"U.S. Appl. No. 11/831,353, Restriction Requirement mailed Sep. 1, 2010", 5 pgs.

"U.S. Appl. No. 13/118,165, Non Final Office Action mailed Oct. 12, 2011", 9 pgs.

* cited by examiner

|   |   |   |
|---|---|---|
| $W_{K_2}$ | $W_{K_3}$ | $W_{K_4}$ |
| $W_{K_1}$ | $W_{K_0}$ | $W_{K_5}$ |
| $W_{K_8}$ | $W_{K_7}$ | $W_{K_6}$ |

*FIG. 4*

|   |   |   |
|---|---|---|
| $\Delta W_{KK_2}$ | $\Delta W_{KK_3}$ | $\Delta W_{KK_4}$ |
| $\Delta W_{KK_1}$ | 0 | $\Delta W_{KK_5}$ |
| $\Delta W_{KK_8}$ | $\Delta W_{KK_7}$ | $\Delta W_{KK_6}$ |

*FIG. 5*

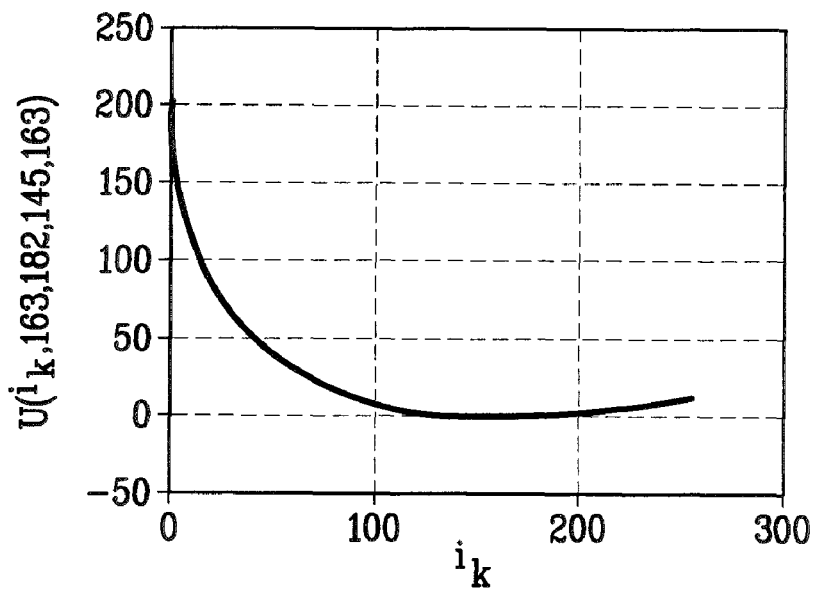
FIG. 9A
FIG. 9B
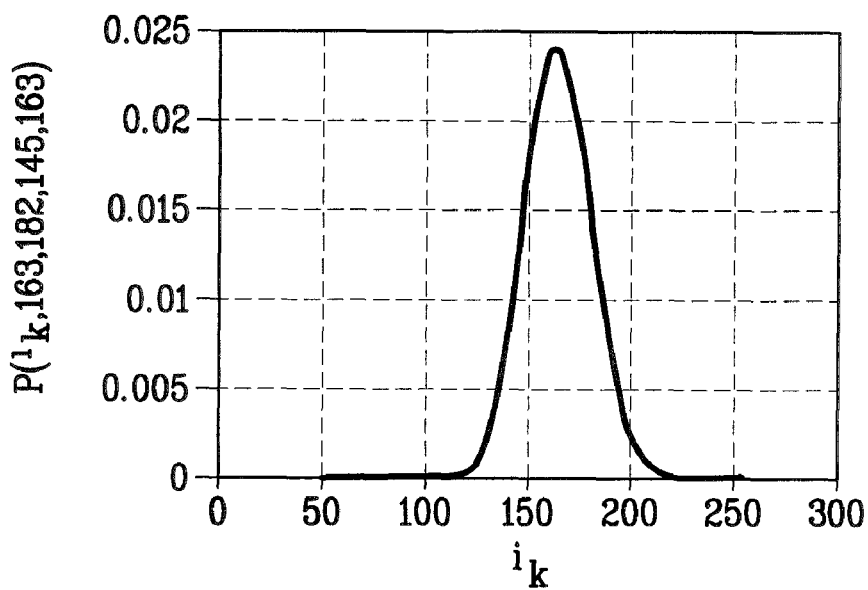
FIG. 9C

SYSTEM AND METHOD FOR REDUCTION OF SPECKLE NOISE IN AN IMAGE

CLAIM OF PRIORITY UNDER 35 U.S.C. §120

The present application for patent is a continuation-in-part of U.S. patent application Ser. No. 11/831,353, entitled "System and Method for Reduction of Speckle Noise in an Image" filed on Jul. 31, 2007, which issued on Jun. 14, 2011, as U.S. Pat. No. 7,961,975, assigned to the assignee hereof and hereby expressly incorporated by reference herein.

BACKGROUND

1. Field of the Present Invention

The present invention relates generally to the field of image processing, and more specifically to the field of de-noising and segmenting coherent images.

2. History of the Related Art

Coherent imaging has a number of practical uses, for example in synthetic aperture radar (SAR) and ultrasonic imaging. For example, SAR has a number of advantages over other passive imaging systems because, as the SAR system emits its own radiation, it is not dependent upon any external source of radiation. Moreover, due to the long wavelengths, most SAR systems are capable of imaging the Earth's surface independent of inclement or adverse weather.

Unfortunately, the efficiency of aerial data collection and visualization with SAR systems is often impeded by their high susceptibility to speckle noise. A SAR system measures both the amplitude and the phase of the signals echoed from the Earth's surface. Due to the microscopic roughness of the reflecting objects on the surface, the amplitudes of the echoed signals reflected from the locality of each targeted spot have random phases. The amplitudes of these signals interfere coherently at the antenna, which ultimately gives rise to the signal-dependent and grainy speckle noise formed in the SAR imagery. Similarly, speckle noise in ultrasonic imaging is caused by the interference of energy from randomly distributed scatters, too small to be resolved by the imaging system. Speckle noise degrades both the spatial and contrast resolution in ultrasonic imaging and thereby reduces the diagnostic value of the images.

There have been a number of speckle noise reduction techniques developed in the image processing field. Some example techniques include the Lee filter and its derivatives, the geometric filter, the Kuan filter, the Frost filter and its derivatives, the Gamma MAP filter, the wavelet approach and some other Markov-based techniques. Unfortunately, each of these approaches assumes that speckle noise is multiplicative relative to the image intensity. While this assumption can be useful in simplifying the complex nature of speckle noise, it does not allow any of the foregoing techniques to substantially eradicate speckle noise from an image.

Ultrasound medical imagery is considered as one of the primary means for imaging organs and tissues. The success of the technique is due to near zero risk for patients and its low cost. By using ultrasound imagery, clinicians avoid unnecessary, instrusive, risky and expensive surgeries to the patients. Unfortunately, speckle noise is an inherent component of any ultrasound medical imaging because of the interference of energy from randomly distributed scatters (e.g., blood and tissue) of ultrasonic waves that are too small to be resolved by the imaging system. In the medical field, speckle noise is typically referred to as "texture" and it generally reduces the image resolution and contrast due to its granular appearance, which can make both visual and automated imaging interpretation difficult. As unreliable medical images can have catastrophic consequences, there is a need in the medical imaging arts to provide ultrasound images with reduced speckle noise.

Similarly, image segmentation is often used in the automated analysis and interpretation of SAR and ultrasound data. Various segmentation approaches have been attempted in the past, such as for example edge detection, region growing technique and thresholding technique. As in the case of speckle noise, each of these techniques is fundamentally flawed in that they either require affirmative user input to segment the image and/or they are adversely affected by the speckle noise otherwise inherent in SAR images and ultrasound images. As such, there is a need in the art of image processing for one or more methods, systems and/or devices for reducing speckle noise in an image as well as segmenting the same image for ease of analysis and interpretation of both SAR and ultrasound data.

SUMMARY OF THE PRESENT INVENTION

Accordingly, the present invention includes methods for the reduction of speckle noise reduction within an image and segmentation of an image. The speckle noise reduction method includes the steps of receiving an image comprising a plurality of pixels and establishing a coherence factor, a noise threshold factor, a pixel threshold factor, and a neighborhood system for pixels. The speckle noise reduction method can also include the steps of performing a uniformity test on a subset of pixels comprising a portion of the plurality of pixels, performing a noise detection test on the subset of pixels, and performing an intensity update on a pixel within the subset of pixels in response to the pixel being substantially non-uniform with respect to its neighborhood. The speckle noise reduction method can further include the step of repeating some or all of the foregoing steps for substantially all of the plurality of pixels in order to produce a speckle-noise reduced image.

The present invention further includes a method of segmenting an image. The segmentation method includes the steps of receiving an image comprising a plurality of pixels and establishing a coherence parameter and a number of classes. For each of the plurality of pixels, the segmentation method includes steps for comparing an intensity of each pixel to an intensity of one or more neighboring pixels, classifying each pixel into a class in response to a maximum value of a conditional probability function in response to the intensity of each pixel, and providing a segmented image in response to the classification of each of the plurality of pixels.

The methods of the present invention are based on the physical statistical properties of one or more pixels in an image. The methods of the present invention are practicable in a number of environments, including for example image processing systems for both SAR systems, ultrasound systems, and other coherent imaging systems. Each of the methods is practicable in real time or near real time, making them quite an efficient use of both time and computing power. Further details and advantages of the present invention are described in detail below with reference to the following Figures.

BRIEF DESCRIPTION OF THE FIGURES

FIG. 4 illustrates a window $W_k$ forming a 3×3 matrix corresponding to one or more pixels in an image in accordance with another aspect of the present invention.

FIG. 5 illustrates the window of FIG. 4 following the subtraction of $i_k$ in accordance with another aspect of the present invention.

FIG. 9A is a pixel neighborhood representation of actual data from a speckled image.

FIG. 9B is a graphical representation of results achieved by a method of removing speckle noise from the image data of FIG. 9A in accordance with another aspect of the present invention.

FIG. 9C is a graphical representation of results achieved by a method of removing speckle noise from the image data of FIG. 9A in accordance with another aspect of the present invention.

DETAILED DESCRIPTION OF THE PREFERRED EMBODIMENTS

The following description of the preferred embodiments is provided to enable any person skilled in the art to make or use the present invention. Various modifications to these embodiments will be readily apparent to those skilled in the art, and the generic principles defined herein may be applied to other embodiments without departing from the spirit or scope of the invention as set forth in the appended claims.

The present invention includes a method of removing speckle noise from an image as well as a method of segmenting an image. Each of the methods of the present invention can be performed by automated systems, including for example image processing systems and the like. The methods of the present invention can be embodied in hardware, software, firmware or any other suitable means for causing an appropriate system to perform the requisite steps and provide a speckle noiseless and/or segmented image. The methods of the present invention are particularly well-suited for SAR and ultrasonic imaging applications or any other suitable imaging system. In particular, the methods of the present invention can be performed by SAR and/or ultrasound systems for improving the image quality of the respective systems. The methods of the present invention are described below with reference to the Figures. However, prior to providing a detailed description of the preferred embodiments, it is useful to provide the following definitions and mathematical framework for the methodology of the present invention.

Figure 1:
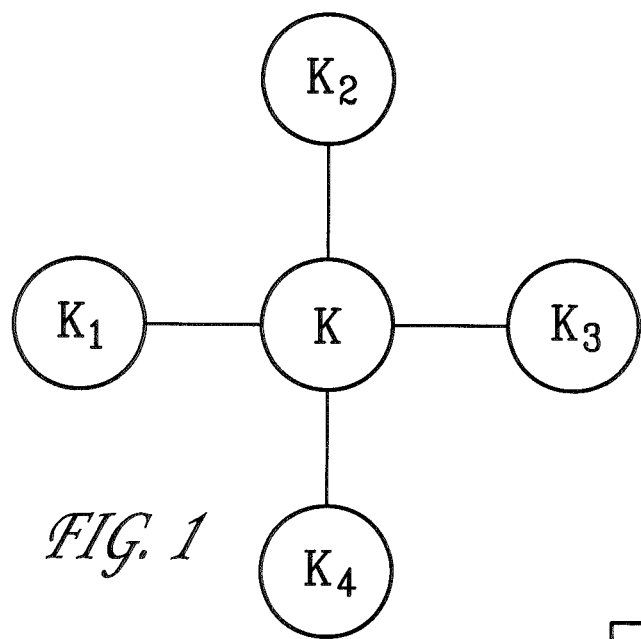
FIG. 1 is a graph form of a first-order neighborhood of pixels for a pixel $I_k$ in accordance with one aspect of the present invention.

As used herein, the term pixel is defined as the smallest complete portion of an image. In accordance with the methodology described herein, any plurality of pixels can be organized and analyzed using a Markov Random Field (MRF) algorithm. As shown in FIG. 1, a pixel k can be defined in part by a first order MRF consisting of a graph function G=(V,E) that has undirected edges drawn as lines. The set of vertices of a segment of the graph, centered at the kth pixel, is given by $V=(k, k_1, k_2, k_3, k_4)$ and E is a set of edges.

Figure 3:
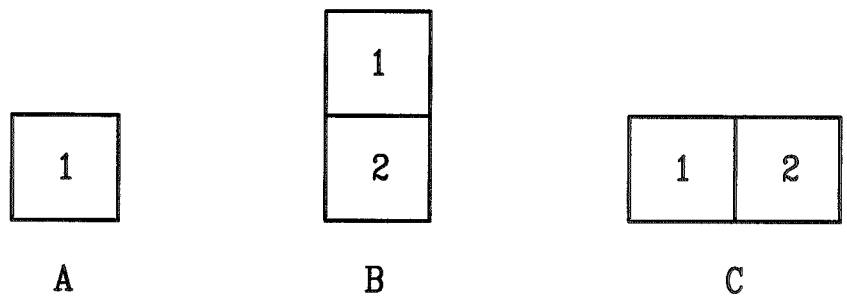
FIG. 3 illustrates a single clique (A), and pair-wise cliques (B) and (C) defined within a first order neighborhood of pixels in accordance with another aspect of the present invention.

From the graph G shown in FIG. 1, the methodology of the present invention is adapted to extract two types of cliques, single cliques and pairwise cliques that are known in the field of MRF. As shown in FIG. 3, a single pixel (1) defines a single clique as shown in example A, while an adjacent pairing of pixels (1 and 2) constitutes a pairwise clique. Pairwise cliques can be oriented vertically or horizontally, as shown in examples B and C of FIG. 3.

Figure 2:
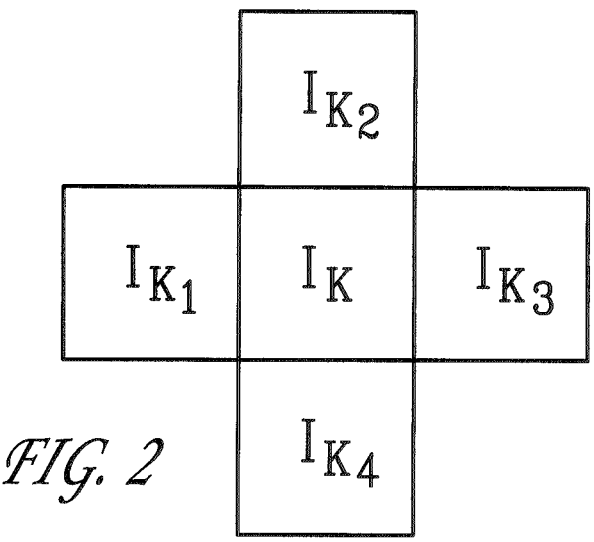
FIG. 2 is a lattice form of a first-order neighborhood of pixels for a pixel $I_k$ in accordance with another aspect of the present invention.

One or more pairwise cliques can be organized into a neighborhood system of pixels, and example of which is shown in FIG. 2. A neighborhood system of pixels includes any one of a plurality of pixels and a subset of the plurality of pixels that is adjacent to the selected pixel. Given a neighborhood system of pixels, the methodology of the present invention is adapted to modify the intensity of any one pixel within that neighborhood system as a function of the intensity of the neighboring pixels. The process is repeatable for all pixels within any number of neighborhood systems that comprise the totality of an image, thereby substantially reducing the speckle noise within the image.

One suitable means for calculating the intensity $I_{kj}$, at a point $k_j$ given the intensity $I_{ki}$ at a point $k_i$ is a conditional probability density function (CPDF). In order to reduce the speckle noise as a function of intensity, the present invention can use a spatially inhomongenous variable $\theta_{kj}$, representing the true intensity of the image at point $k_j$. The true intensity of the image at point $k_j$ corresponds to the statistical optical properties of the image, which necessarily provides improvements in the present invention over the noted prior systems. Denoting a random variable $I_{kj}$ at point $k_j$ by $i_{kj}$ yields a CPDF of the following form:

$$P_{I_{kj}|I_{ki}}(i_{kj}|i_{ki}) = \{\exp\{[-|\mu(r_{kikj})^2|i_{ki}+i_{kj}]/\theta_{kj}(1-|\mu(r_{kikj})^2|)\}/(\theta_{kj}(1-|\mu(r_{kikj})^2|))\}I_o\{2(i_{ki}i_{kj})^{1/2}|\mu(r_{kikj})|/\theta_{kj}(1-|\mu(r_{kikj})^2|)\}, \quad (1)$$

where $\theta$ is defined as the true spatial intensity (based on the physical properties of the pixels) at a point $k_j$, $|\mu(r_{kikj})|$ is defined as a coherence factor, and $r_{kikj}$ is defined as the Euclidian distance between the points $k_i$ and $k_j$.

In one alternative to the method of the preferred embodiment, the methodology assumes that the coherence factor has the following form:

$$|\mu(r_{kikj})| = \{|\alpha_{rkikj}|\} \in [0, 1), r_{kikj} \leq 1, \text{ or} \quad (2)$$
$$= 0, \text{ otherwise.}$$

If $r_{kikj}$ is greater than one, then the CPDF in equation (1) becomes independent of $i_{ki}$ and the density of the speckle intensity becomes an exponential function of the form $p_{I_{kj}}(i_{kj}) = \exp(-i_{kj}/\theta_{kj})\theta_{kj}$.

In other alternative embodiments, the methodology of the present invention can implement a larger correlation, i.e. greater than one pixel, for certain types of images. For example, the methodology can be configured to preprocess the data or apply a spatial-interpolation or down-sampling scheme for images having a larger correlation. In such a manner, even images having a larger correlation can be processed according to the methodology described above.

Referring back to FIG. 3, the Euclidean distances between the pairs of pixels ($i_{k1}$, $i_{k2}$), ($i_{k2}$, $i_{k3}$), ($i_{k3}$, $i_{k4}$) and ($i_{k4}$, $i_{k1}$) is the square root of two, and the distances between the pairs ($i_{k2}$, $i_{k4}$) and ($i_{k1}$, $i_{k3}$) are two. As such, the distance in both cases is greater than one, and therefore using the coherence factor of equation (2) demonstrates that these pairs of pixels are conditionally independent of the center pixel $i_k$. As such, using Bayes rules, the CPDF of the intensity of the center pixel $i_k$ as a function of its neighbors $i_{k1}$, $i_{k2}$, $i_{k3}$, and $i_{k4}$ takes the form:

$$p_{I_k|I_{k1}\ldots 4}(i_k|i_{k1}\ldots i_{k4}) = [p_{I_k|I_{k1}}(i_k|i_{k1})p_{I_k|I_{k2}}(i_k|i_{k2}) p_{I_k|I_{k3}}(i_k|i_{k3})p_{I_k|I_{k4}}(i_k|i_{k4})]/[p_{I_k}(i_k)]^3. \quad (3)$$

As each term in equation (3) is known from equation (1), the CPDF of the center pixel can take the form:

$$p_{I_k|I_{k1}\ldots 4}(i_k|i_{k1}\ldots i_{k4}) = \exp\{\Sigma - \ln[B(i_k,i_{kj})] - ([A(i_k,i_{kj})]/[B(i_k,i_{kj})])\} + \ln\{\mathcal{I}_0([C(i_k,i_{kj})]/[B(i_k,i_{kj})]) - 3\ln[p_{I_k}(i_k)]\}, \quad (4)$$

where $A(i_k, i_{kj})$ equals $|\alpha_{rkkj}|^2 i_{kj} + i_k$, $B(i_k, i_{kj})$ equals $(1|\alpha_{rkkj}|^2)$ $\theta_k$ $C(i_k, i_{kj})$ equals $2(i_k, i_{kj})^{1/2}|\alpha_{rkkj}|$, the summation is from j=1 to 4, and $\mathcal{I}_0$ is the modified Bessel function of the first kind and zero order.

In another variation of the method of the preferred embodiment, the parameter $\theta_k$ which represents the true pixel intensity at index "k," can be approximated in equation (4) by the empirical average of the observed pixel values within a predetermined window, or matrix, of pixels. For example, FIG. 4 illustrates a 3×3 window centered about the pixel $k_o$. FIG. 5 illustrates a corresponding window following the subtraction of $i_k$. In practice of the methodology of the present invention, a skilled artisan could select windows of any measurable size or shape. As shown in FIGS. 4 and 5, the windows are 3×3 square matrices, and as such the pixel $k_o$ has eight neighbors.

As noted above, the methodology of the present invention can employ a MRF distribution function to update the intensity of one or more pixels in the image. Equation (4) can be rewritten as the following:

$$p_{I_k|I_{k1}\ldots 4}(i_k|i_{k1}\ldots i_{k4}) = \exp[-U(i_k,i_{k1}\ldots i_{k4})], \text{ where}$$

$$U(i_k,i_{k1}\ldots i_{k4}) = V_{C1}(i_k) + V_{C2}(i_k,i_{k1}\ldots i_{k4}), \text{ and}$$

$$V_{C1}(i_k) = 3\ln[p_{I_k}(i_k)], \text{ such that}$$

$$V_{C2}(i_k,i_{k1}\ldots i_{k4}) = \Sigma\{([A(i_k,i_{kj})]/[B(i_k,i_{kj})]) - \ln[\mathcal{I}_0([C(i_k,i_{kj})]/[B(i_k,i_{kj})])] - \ln/[B(i_k,i_{kj})])\}. \quad (5)$$

As in equation (4), the summation is from j=1 to 4, and $\mathcal{I}_0$ is the modified Bessel function of the first kind and zero order.

Given equation (5), it is straightforward to identify the energy function as $U(i_k, i_{k1}\ldots i_{k4})$. Referring back to FIG. 3, it is also apparent that the potential functions $V_{C1}(i_k)$ and $V_{C2}(i_k,i_{k1}\ldots i_{k4})$ refer to the single and pairwise cliques, respectively. Finally, it is also apparent that the energy function described above is a convex function, such as for example a convex Gibbs energy function. Given the foregoing definitions and mathematical framework, the methodology of the present invention will be further detailed with reference to its preferred embodiment and variations thereof.

The speckle-noise reduction method of the preferred embodiment includes the steps of receiving an image comprising a plurality of pixels and establishing a coherence factor, a noise threshold factor, a pixel threshold factor, and a neighborhood system for pixels. As used herein, the neighborhood system for pixels comprises a first pixel and one or more neighboring pixels as illustrated below. The speckle noise reduction method of the preferred embodiment also includes the steps of performing a uniformity test on a subset of pixels comprising a portion of the plurality of pixels, performing a noise-detection test on the subset of pixels, and performing an intensity update on a pixel within the subset of pixels in response to the pixel being substantially non-uniform with respect to its neighborhood. The speckle noise reduction method of the preferred embodiment can further include the step of repeating some or all of the foregoing steps for substantially all of the plurality of pixels in order to produce a speckle-noise reduced image.

Figure 6A:
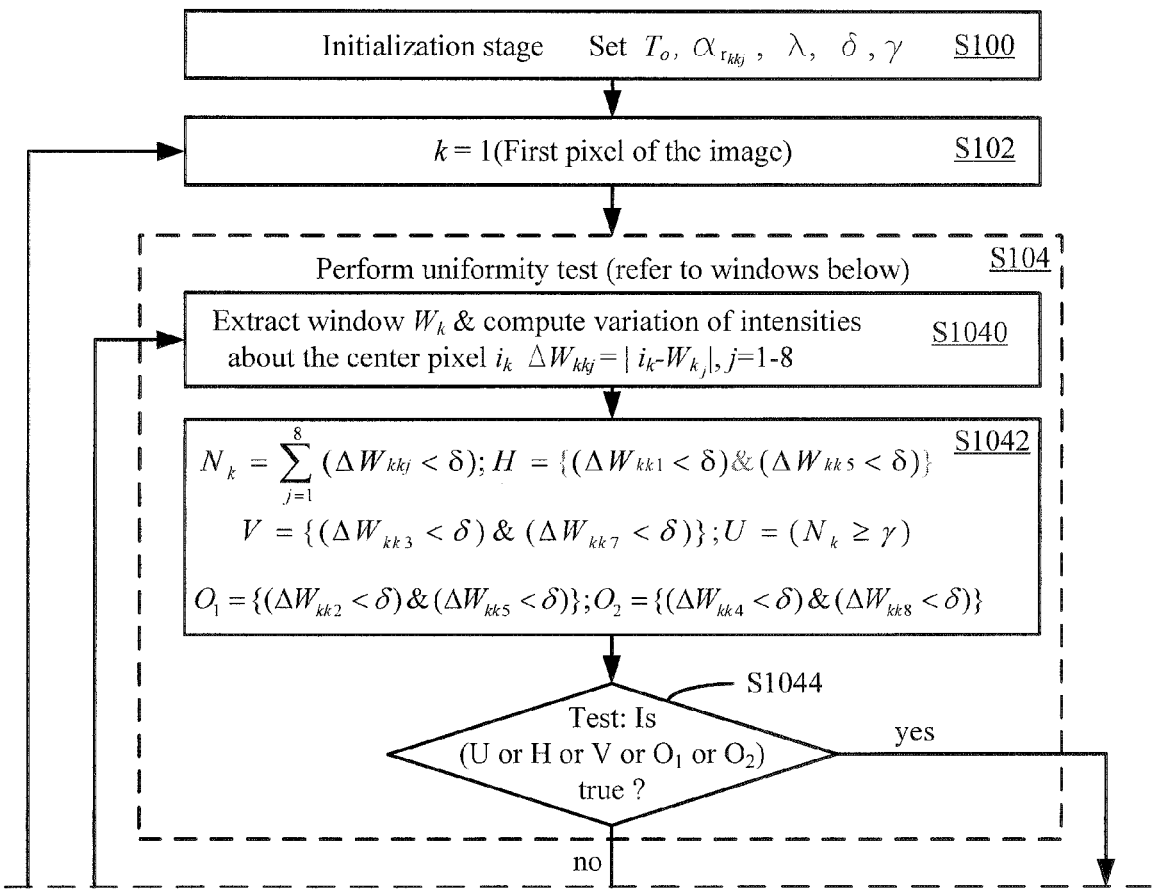
FIG. 6A is a first portion of a flow chart depicting an exemplary method of removing speckle noise from an image in accordance with another aspect of the present invention.
Figure 6B:
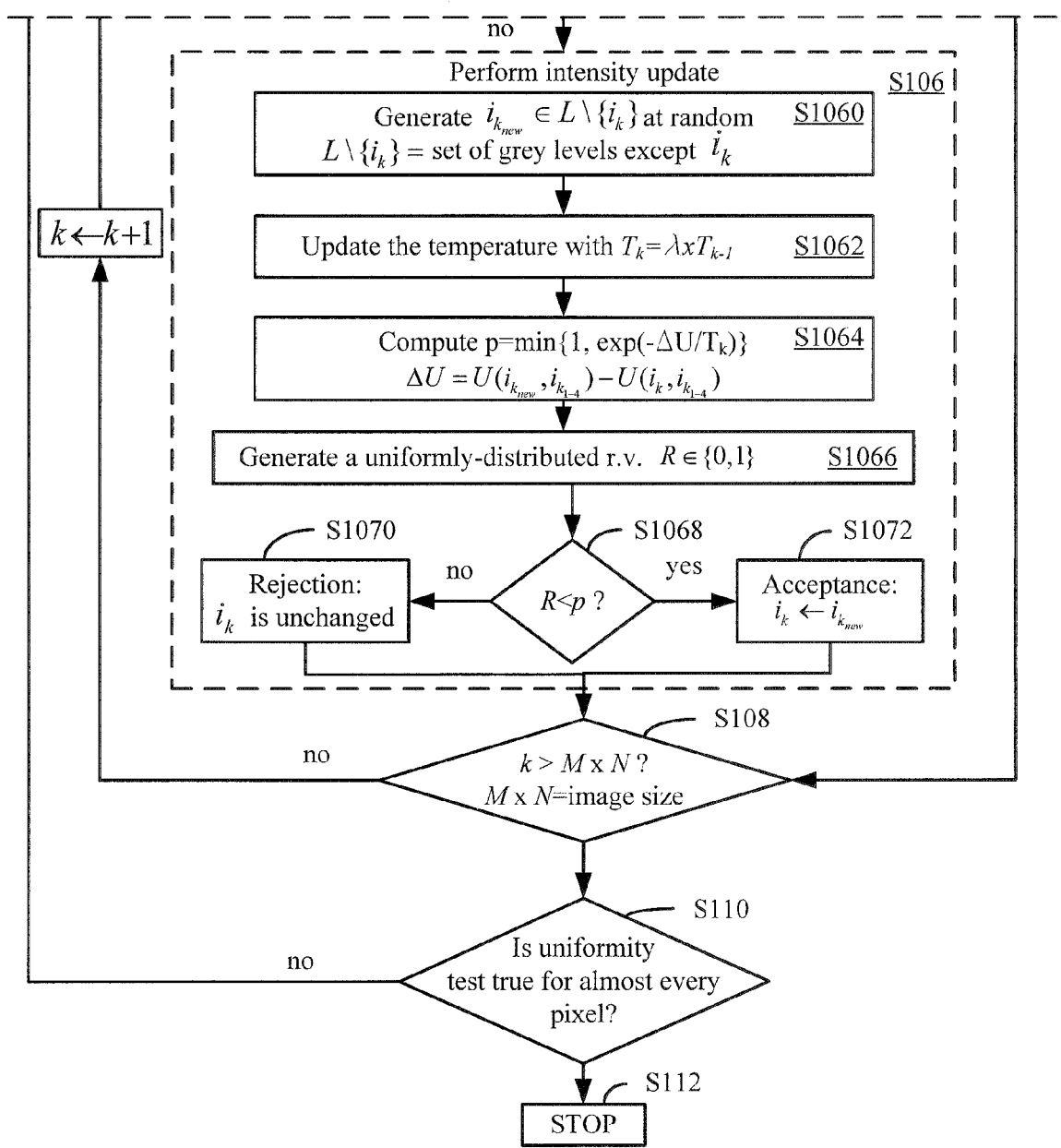
FIG. 6B is a second portion of a flow chart depicting an exemplary method of removing speckle noise from an image in accordance with another aspect of the present invention.

In FIGS. 6A and 6B, various aspects of the speckle-noise reduction method of the preferred embodiment are illustrated in a flow chart diagram. In one variation of the speckle noise method of the preferred embodiment, the method begins at step S100, in which the method is initialized by selecting or estimating one or more parameters. The parameters can include for example $T_o$ (an initial temperature), $\alpha_{rkkj}$ (a coherence factor), $\lambda$ (a cooling scheme), $\delta$ (a threshold parameter for line and/or noise detection) and/or $\gamma$ (a threshold number of pixels within a window $W_k$, described above with reference to FIGS. 4 and 5 whose variations are below $\delta$). The initialization parameters can be altered and/or predetermined based on any number of conditions, including the size and/or complexity of the image, the number of iterations of the method that are necessary to de-noise the image, as well as user preference. Alternatively, one or more of the parameters can be estimated from the image using for example a pseudo-likelihood approach. Once the initialization parameters are selected or estimated, the method can proceed to step S102, in which a first pixel k of the image is selected for de-noising.

In step S104, the method of FIG. 6 recites performing a uniformity test on the first pixel k with respect to its window/ neighborhood system as described above. The uniformity test can further include steps S1040, S1042 and S1044. In step S1040, the illustrated method recites extracting a window $W_k$ and computing the variation of pixel intensities within the window relative to the center pixel $i_k$. The computation can take the form of computing the absolute value of the intensity of each pixel in the window relative to the intensity of the center pixel, thereby determining a variation within the window. As shown in FIG. 5, if the window is a 3×3 matrix of pixels, then the center pixel is compared to each of the surrounding eight pixels.

Step S1042 of the illustrated method recites evaluating the intensity variation within the window relative to a plurality of parameters. As shown in FIG. 6, the method can evaluate at least the following propositions: $N_k = \Sigma(\Delta W_{kkj} < \delta)$ from j=1 to 8; $H = \{(\Delta W_{kk1} < \delta) \& (\Delta W_{kk5} < \delta)\}$; $V = \{(\Delta W_{kk3} < \delta) \& (\Delta W_{kk7} < \delta)\}$; $U = (N_k \geq \gamma)$; $O_1 = \{(\Delta W_{kk2} < \delta) \& (\Delta W_{kk6} < \delta)\}$; and $O_2\{(\Delta W_{kk4} < \delta) \& (\Delta W_{kk8} < \delta)\}$. Step S1044 of the illustrated method recites testing whether any of U (uniform neighborhood test) or H (horizontal line test) or V (vertical line test) or $O_1$ (first oblique line test) or $O_2$ (second oblique line test) is true. The truth or falsehood of the foregoing proposition is indicative of the homogeneity of intensity within the window as well as the presence and/or absence of lines. If any of the foregoing is true, then the intensity of the pixels within the window are substantially uniform and/or that any lines are highly variable, in which case the illustrated method proceeds to step S108. If none of the foregoing propositions are true, then the intensity of the pixels within the window is not substantially uniform and/or no lines are present within the window, which is indicative of speckle noise occurring within the window. In such a case, the illustrated method proceeds to step S106, in which an intensity update is performed using a simulated annealing algorithm.

The intensity update of step S1106 can also include a plurality of steps therein. One such step includes step S11060, in which a new pixel intensity $i_{knew}$ is generated, wherein $i_{knew} \in L \setminus \{i_k\}$ is generated at random and wherein $L \setminus \{i_k\}$ is defined as a set of all or substantially all grey levels except $i_k$. In step S1062, the temperature $T_o$ is updated to $T_k = \lambda \times T_{k-1}$. In step S1064, the illustrated method recites minimizing a probability function of the form $p = \min\{1, \exp(-\Delta U/T_k)\}$, wherein $\Delta U = U(i_{knew}, i_{k1 \ldots 4}) - U(i_k, i_{k1 \ldots 4})$, and further wherein U is a function expressing the energy of the pixel as described above. The energy function gradually updates the intensity of the pixel as a function of the temperature, which gradually decreases as a function of $\lambda$. In step S1066, the illustrated method recites generating a uniformly distributed r.v. $R \in \{0,1\}$ for accepting or rejecting the pixel's updated intensity through a sampling scheme. In step S1068, the illustrated method queries whether $R < p$. If the answer is affirmative, then the updated intensity of the pixel is accepted in step S1072 to $i_{knew}$ and the illustrated method proceeds to step S108. If the answer is negative, then the updated intensity of the pixel is rejected in step S1070 and the pixel intensity is maintained at the original $i_k$, after which the illustrated method proceeds to step S108.

In step S108, the illustrated method queries whether the index k is greater than M×N, which is defined as the image size. If the answer is affirmative, then the illustrated method proceeds to step S110. If the answer is negative, then the illustrated method returns to step S104, at which time a new candidate pixel k+1 is selected for the foregoing processes. In step S110, the illustrated method queries whether the uniformity test, i.e. step S104 and its associated sub-steps, is true for almost every pixel. If the answer is negative, then the illustrated method returns to step S102 and selects another first pixel k of the image. If the answer is affirmative, then the illustrated method terminates at step S112, indicating that the speckle noise of the image has been substantially reduced and/or eliminated.

Upon completion of the illustrated method, the speckle reduced image can be provided to a user in any number of ways. For example, the image can be saved, displayed, transmitted, or otherwise made available to a user for further analysis, manipulation and/or modification.

In a variation of the method described above, the intensity update of step S106 can be performed using a different non-linear estimation approach instead of using the simulated annealing (SA) algorithm described above. Recalling from above the spatially inhomongenous variable $\theta_k$, representing the true intensity of the image at a pixel k of the image, the present invention provides a nonlinear estimator function for $\theta_k$ defined by the conditional expectation:

$$\Theta_k = E[I_k \setminus \{I_k\}], \quad (6)$$

where $I \setminus \{I_k\}$ is the set of all pixels in the image excluding $I_k$. Given the Markovian nature of I, equation (6) can be rewritten as:

$$\Theta_k = E[I_k \setminus N_k], \quad (7)$$

where $N_k = \{I_{k1}, I_{k2}, I_{k3}, I_{k4}\}$, constitutes the set of intensities of the four pixels adjacent to k and the associated CPDF shown above in equation (4).

Unlike the prior variation of the method of the preferred embodiment, the methodology including the foregoing non-linear estimator does not require the definition of the temperature parameter in the initialization phase to perform. Otherwise, each of steps S100, S102 and S104 are identical to those described above with reference to FIG. 6. However, in this variation of the method of the preferred embodiment, the step of updating the intensity of the pixel consists of two sub-steps related to the non-linear estimator noted above.

In order to perform the intensity update step using the non-linear estimator, this variation of the method recites computing $p_{Ik \setminus Ik1 \ldots 4}(i_k|i_{k1} \ldots i_{k4}) = \exp[-U(i_k, i_{k1} \ldots i_{k4})]$, for $i_k = W_{kj}$ wherein j ranges for zero to eight for a 3×3 window. Following this computation, this variation of the method of the preferred embodiment recites performing the intensity update $i_k \leftarrow \Theta_k$, wherein as noted above $\Theta_k = E[I_k | I \setminus I_{k1} \ldots I_{k4}]$, which in turn can be written as $\Theta_k = \Sigma i_k P_{ik}|I_{k1} \ldots I_{k4})$ $(i_k \setminus i_{k1} \ldots i_{k4})$, summing from $i_k = W_{ko}$ to $W_{k8}$ for a 3×3 window.

In this variation of the method of the preferred embodiment, the pixel is tested as before by computing the intensity variability within the window. As before, low variability in intensity within the window or along a direction (in the presence of lines) is indicative of relative intensity homogeneity, which in turn implies that the pixel is not sufficiently noisy as defined by the parameters $\delta$ and $\gamma$, described above. In this instance, the intensity of the pixel is not updated. However, in the case in which the variability of the intensity within the window is found to sufficiently high, the pixel is replaced with a pixel having an intensity estimated according to the non-linear estimator function described above. In one alternative embodiment, the method can restrict the set of intensity values for $i_k$ to only those intensity values corresponding to pixels within the window, i.e. a total of eight intensity values for a 3×3 window. Alternatively, the set of intensity values for $i_k$ can be any set of potential values, such as for example the set $\{0, \ldots, 255\}$.

After updating the pixel k using the non-linear estimator function described above, this variation of the method of the preferred embodiment proceeds to steps S108, S110 and S112, described above with reference to FIG. 6. As before, upon completion of the illustrated method, the speckle reduced image can be provided to a user in any number of ways. For example, the image can be saved, displayed, transmitted, or otherwise made available to a user for further analysis, manipulation and/or modification.

Another aspect of the present invention includes a system and method for the reduction of speckle noise in an image that employs a systematic and automated approach for determining the coherence parameter $\alpha$ through a pseudo-likelihood (PL) estimate. A suitable logarithm PL function is defined as:

$$\ln PL(I|\alpha_{rkkj}) = -\Sigma U(i_k, i_{k1}, \ldots i_{k4}|\alpha_{rkkj}) + Cst, \quad (8)$$

where I is one realization of the MRF, $\partial I$ denotes the set of points at the boundaries of the image I and K is in term of the normalizing constant. As the proposed MRF is characterized by the Gibbs energy function, it is both homogenous and isotropic. It follows therefore that:

$$\alpha = \alpha_{rkkj}, \quad (9)$$

for any two points in the image. The maximum PL estimate of $\alpha$ can be obtained by solving the following:

$$(\partial \ln PL(I|\alpha))\partial \alpha = 0. \quad (10)$$

Combining equations (5) and (8) yields a function incorporating modified Bessel functions of the first kind zero and first-order, which in turn can be rewritten as follows:

$$\Sigma_{k \in I - \partial I} \Sigma_j Q_1(i_{kj}, i_k, \theta_k \alpha) + Q_2(i_{kj}, i_k, \theta_k \alpha) - ((2\alpha)/(1-\alpha^2)) = 0, \quad (11)$$

where the index j is summed from one to four. Equation (11) can be solved numerically using one or more methods including for example the fixed-point iteration, the Newton or secant method as well as a hybrid method known as Brent's method which is the function "fzero" in the software program Matlab® available from The MathWorks, Inc., Natick, Mass.

Figures 8, 8A:
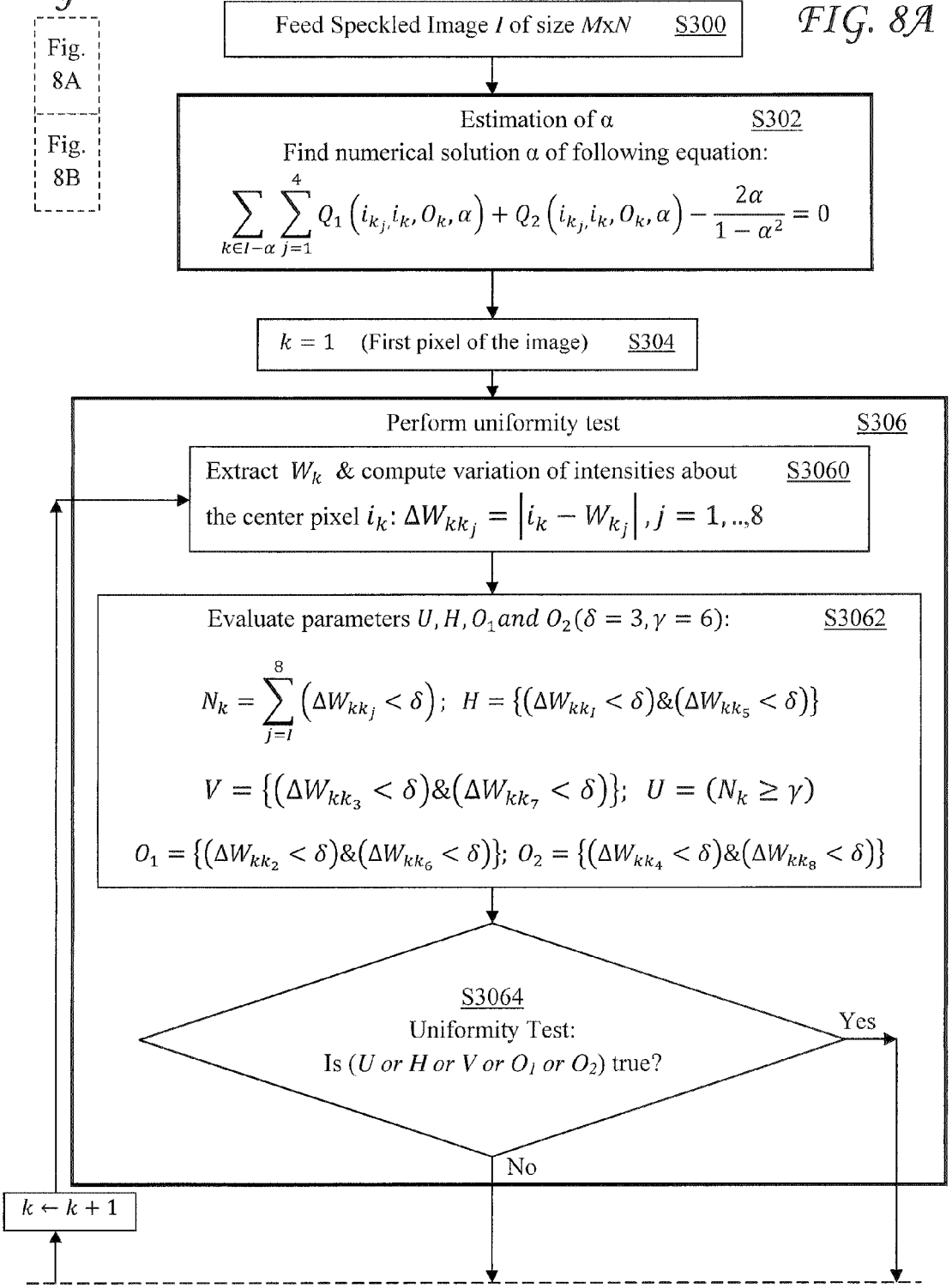
FIGS. 8A and 8B are flow charts, referred to generally as FIG. 8, depicting an exemplary method of removing speckle noise from an image in accordance with another aspect of the present invention.
Figure 8B:
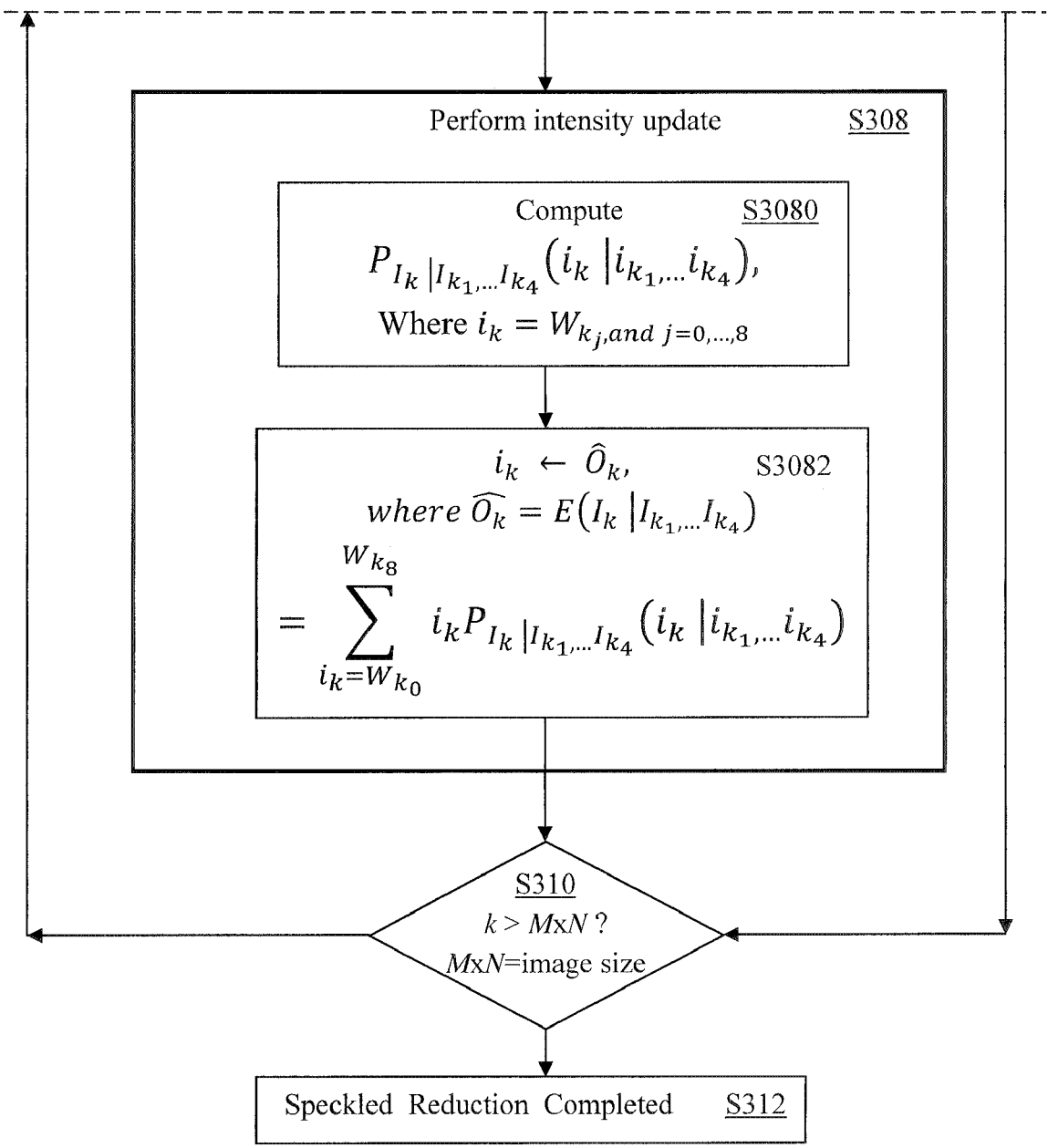

Another preferred embodiment methodology includes a Markov random field conditional expectation approach (MRFCEA) usable in reducing or eliminating the speckle noise in an image, such as an ultrasound or SAR image. As shown in FIG. 8, which is separated into two sections 8A and 8B, step S300 recites that a speckled image I of size M×N is received, for example at an image processor from an appropriate image detector, e.g. ultrasound or SAR detector. In step S302, the exemplary method recites finding a numerical solution to equation (11) above. As noted, in variations of the method of the preferred embodiment, the solution to equation (11) can be found through various functions and methods, including at least the fixed-point iteration, the Newton or secant method as well as a hybrid method known as Brent's method. In step S304, a first pixel of the image is selected for processing, and in step S306 of the method of the preferred embodiment recites performing a uniformity test. One function of the uniformity test is to detect noisy pixels in comparison to a threshold, as noted above. Another function of the uniformity test is to differentiate between a true edge and noisy pixels as edges can be confused with spatial noise due to the large variability in intensity.

The uniformity test can further include steps S3060, S3062 and S3064. In step S3060, the illustrated method recites extracting a window $W_k$ and computing the variation of pixel intensities within the window relative to the center pixel $i_k$. The computation can take the form of computing the absolute value of the intensity of each pixel in the window relative to the intensity of the center pixel, thereby determining a variation within the window. As shown in FIG. 8, if the window is a 3×3 matrix of pixels, then the center pixel is compared to each of the surrounding eight pixels.

Step S3062 of the method of the preferred embodiment recites evaluating the intensity variation within the window relative to a plurality of parameters. As shown in FIG. 8, the method can evaluate at least the following propositions: $N_k = \Sigma(\Delta W_{kkj} < \delta)$ from j=1 to 8; $H = \{(\Delta W_{kk1} < \delta) \& (\Delta W_{kk5} < \delta)\}$; $V = \{(\Delta W_{kk3} < \delta) \& (\Delta W_{kk7} < \delta)\}$; $U = (N_k \geq \gamma)$; $O_1 = \{(\Delta W_{kk2} < \delta) \& (\Delta W_{kk6} < \delta)\}$; and $O_2 \{(\Delta W_{kk4} < \delta) \& (\Delta W_{kk8} < \delta)\}$. Step S3064 of the illustrated method recites testing whether any of U (uniform neighborhood test) or H (horizontal line test) or V (vertical line test) or $O_1$ (first oblique line test) or $O_2$ (second oblique line test) is true. The truth or falsehood of the foregoing proposition is indicative of the homogeneity of intensity within the window as well as the presence and/or absence of lines. If any of the foregoing is true, then the intensity of the pixels within the window are substantially uniform and/or that any lines are highly variable, in which case the illustrated method proceeds to step S310. If none of the foregoing propositions are true, then the intensity of the pixels within the window is not substantially uniform and/or no lines are present within the window, which is indicative of speckle noise occurring within the window. In such a case, the illustrated method proceeds to step S308, in which an intensity update is performed using a simulated annealing algorithm.

The intensity update of step S308 can also include a plurality of steps therein. One such step includes step S3080, in which the illustrated method recites computing $p_{Ik|Ik1 \ldots 4}(i_k|i_{k1} \ldots i_{k4})$, where $i_k = W_{kj}$ and j is an index ranging between zero and eight. Step S3080 functions to ensure low or no intensity variability of pixel intensity within a window $W_k$, (of example size 3×3). Low variability in intensity within the window or along an edge is indicative of relative intensity homogeneity, which in turn implies that the pixel is relatively less noisy based on a threshold set by the parameters $\delta$ and $\gamma$ described above. If the variability in intensity is relatively high then the pixel is replaced in accordance with illustrated step S3082. As shown in step S3082, this variation of the method of the preferred embodiment recites performing the intensity update $i_k \leftarrow \Theta_k$, wherein as noted above $\Theta_k = E[I_k|I\backslash I_{k1} \ldots I_{k4}]$, which in turn can be written as $\Theta_k = \Sigma i_k P_{ik}|I_{k1} \ldots I_{k4}(i_k|i_{k1} \ldots i_{k4})$, summing from $i_k = W_{ko}$ to $W_{k8}$ for a 3×3 window.

As noted above, in a case in which the variability of the intensity within the window is found to sufficiently high, the pixel can be replaced with a pixel having an intensity estimated according to the non-linear estimator function described above. In one alternative embodiment, the method can restrict the set of intensity values for ik to only those intensity values corresponding to pixels within the window, i.e. a total of eight intensity values for a 3×3 window as shown in FIG. 8. Alternatively, the set of intensity values for ik can be any set of potential values, such as for example the set $\{0, \ldots, 255\}$.

However, in most cases a larger index value for $i_k$ will not be necessary as the probability of any pixel intensity outside the window $W_k = \{W_{ko}, \ldots, W_{k8}\}$ is nearly zero and therefore their contribution to the estimated intensity value can also be negligible. For example, FIG. 9A illustrates a 3×3 window of intensities quantified from an actual speckled image. FIG. 9B is a graphical representation of the Gibbs energy function U for each of the intensities shown in FIG. 9A. FIG. 9C is a probability distribution P for each of the values, showing concentration of an intensity value between one hundred fifty and two hundred. As shown in FIG. 9C, the probability of other intensity values decreases dramatically, thereby reinforcing the ability of the methods described herein for updating pixel intensity based on the selected window $W_k = \{W_o, \ldots, W_{k8}\}$.

Upon completion of the intensity update of the method of the preferred embodiment, the illustrated method can proceed to step S310, which queries whether the index k is greater than M×N, which is defined as the image size. If the answer is affirmative, then the illustrated method proceeds to step S312 and the speckle reduced imaging can be viewed, printed or otherwise converted into a format suitable for a user. If the answer is negative, then the illustrated method returns to step S304, at which time a new candidate pixel k+1 is selected for the foregoing processes and methodologies of the preferred embodiment and variations thereof.

The present invention further includes a method of segmenting an image. The segmentation method of the preferred embodiment includes the steps of receiving an image comprising a plurality of pixels and establishing a coherence parameter and a number of classes. For each of the plurality of pixels, the segmentation method of the preferred embodiment includes comparing an intensity of each pixel to an intensity of one or more neighboring pixels, classifying each pixel into a class in response to a maximum value of a conditional probability function in response to the intensity of each pixel, and providing a segmented image in response to the classification of each of the plurality of pixels. The segmentation method of the preferred embodiment is practicable in a number of environments, including for example image processing systems for both SAR systems, ultrasound systems, and other coherent imaging systems.

Figure 7:
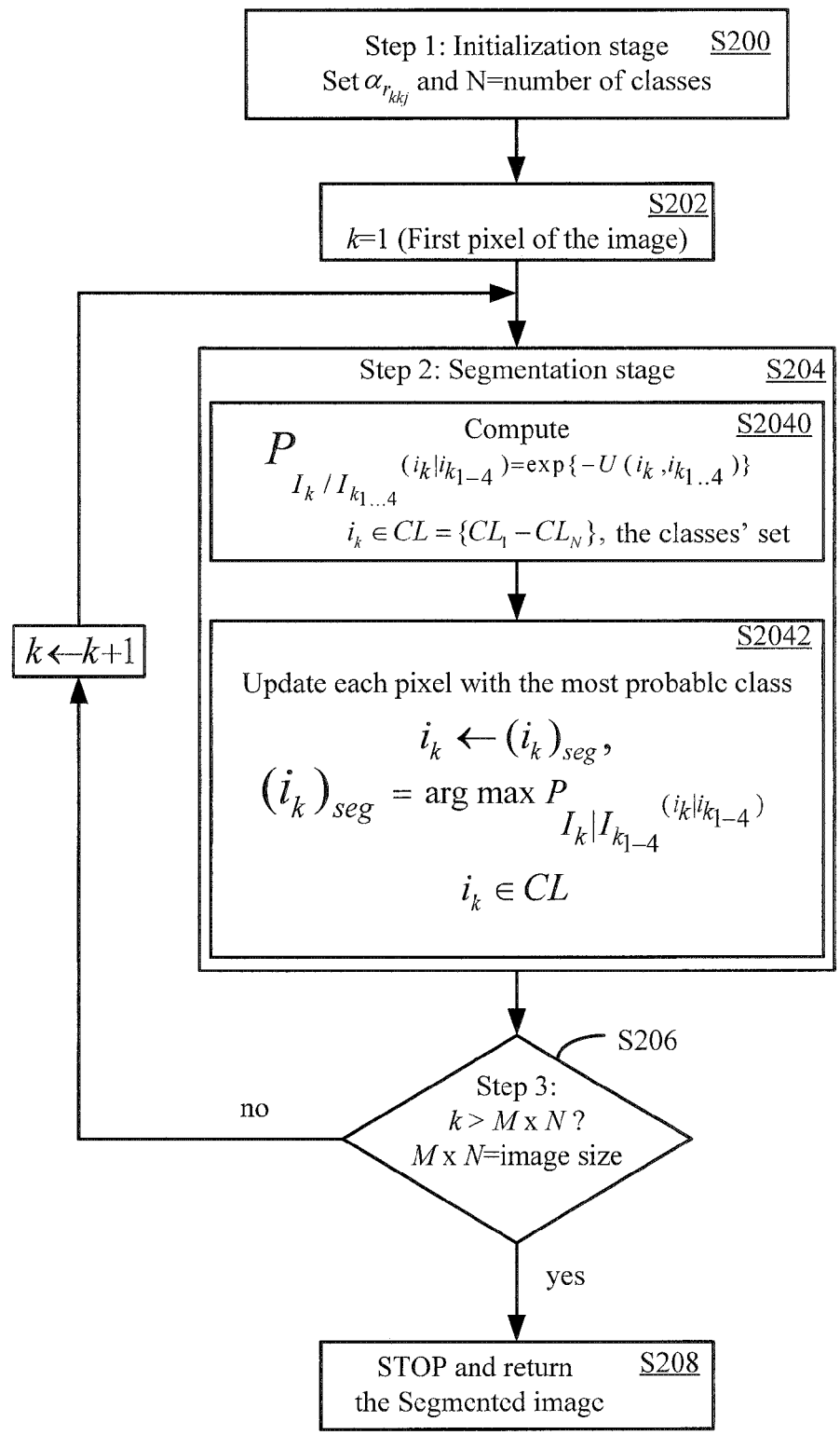
FIG. 7 is a flow chart depicting an exemplary method of segmenting an image in accordance with another aspect of the present invention.

One implementation of the segmentation method of the preferred embodiment is shown in the flowchart of FIG. 7. As shown therein, step S200 recites an initialization phase in which a coherence parameter ($\alpha_{rkkj}$) and number of classes (N) are established. Alternatively, the coherence parameter $\alpha$ can be calculated numerically in accordance with the methodology described above with reference to FIG. 8. In step S202, a first pixel k is selected for analysis according to the segmentation step of the method step S204. The segmentation step includes scanning each pixel within the image and replacing it with a replacement pixel representing the class that represents the first pixel's highest CPDF. For example, step S2040 recites computing $p_{Ik \backslash Ik1 \ldots 4}(i_k \backslash i_{k1 \ldots 4}) = \exp[-U(i_k, i_{k1 \ldots 4})]$, for $i_k = W_{kj}$, where $i_k \in CL = \{CL_1 \ldots CL_4\}$, the classes' set. Step S2040 functions to run the intensity of each pixel over all possible grey level values and the one the yields the highest value of the CPDF (as a function of the intensity of its neighbors) is selected. As in the speckle noise reduction techniques noted above, the function U is a cost function (energy function) that is convex in nature. Accordingly, a minimization of the function U is reached without the need for computationally intensive procedures, i.e. the cost function can be minimized by maximizing the CPDF for each pixel in the image. The function U can be for example a convex Gibbs energy function, of the type described above.

In step S2042, the class (CL) corresponding to the CPDF maximizing grey level is assigned to the pixel k, a process which is repeatable for every pixel in the image. As shown in FIG. 7, each pixel is updated $i_k \leftarrow (i_k)_{seg}$, where $(i_k)_{seg} = \arg\max P_{Ik|I_{k1-4}}(i_k|i_{k1-4})$, and where $i_k \in CL$. As noted above, the segmentation steps are repeatable for all pixels in the image. As such, step S206 of the illustrated method queries whether the index k is greater than M×N, which is defined as the image size. If the answer is affirmative, then the illustrated method proceeds to step S208. If the answer is negative, then the illustrated method returns to step S204, at which time a new candidate pixel k+1 is selected for the foregoing processes.

Step S208 terminates the method and produces the segmented image for the user. Upon completion of the illustrated method, the segmented image can be provided to a user in any number of ways. For example, the image can be saved, displayed, transmitted, or otherwise made available to a user for further analysis, manipulation and/or modification.

Figure 10:
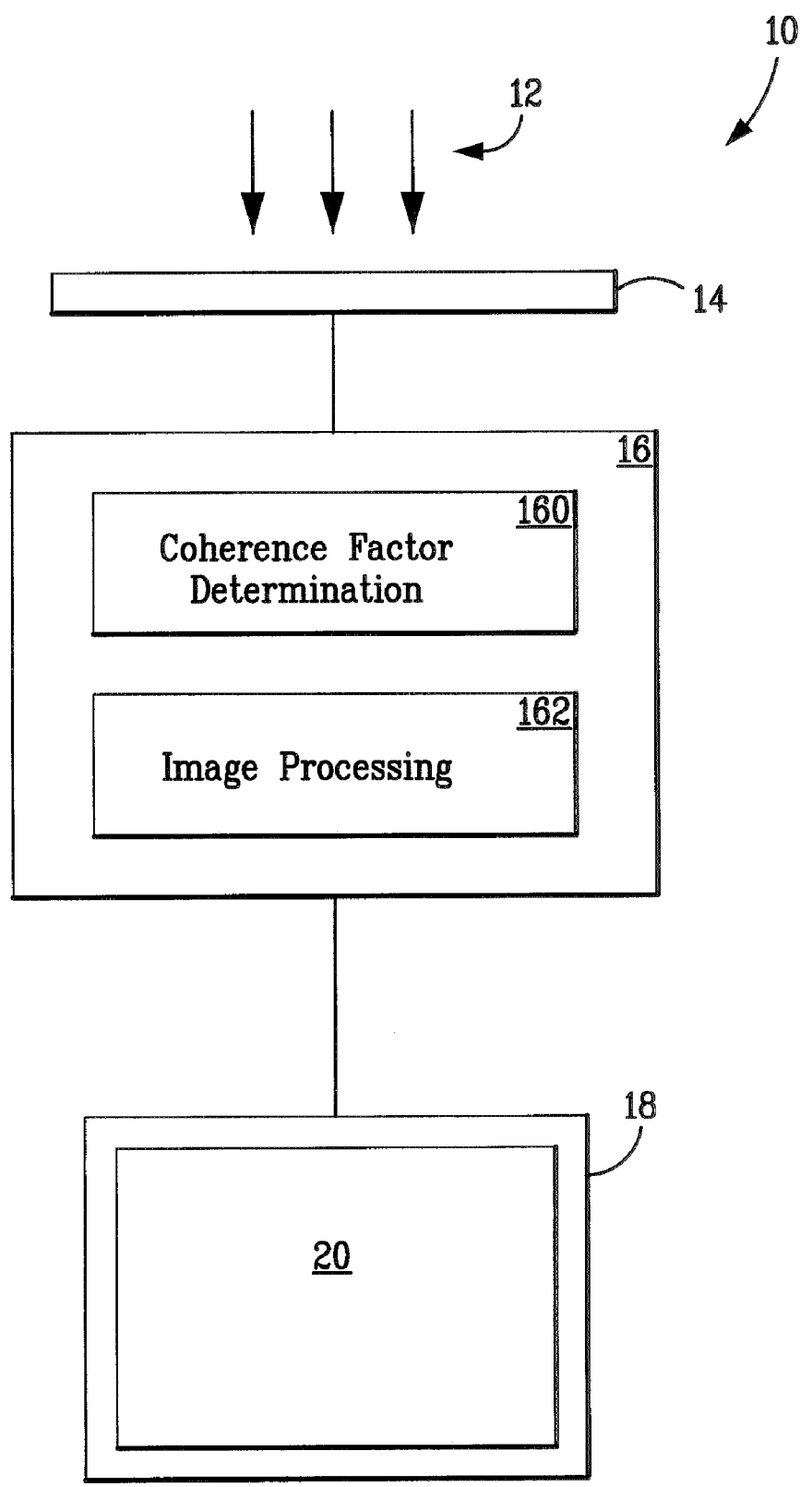
FIG. 10 is a schematic block diagram of a system for removing speckle noise from an image and/or segmenting an image in accordance with various aspects of the present invention.

All of the foregoing methodologies can be performed one or more apparatuses or systems for reducing speckle noise in an image. As shown in FIG. 10, a system 10 of the preferred embodiment can include an image receive 14 adapted to receive signals 12 of a particular type of coherent imaging input, such as for example ultrasonic waves in an ultrasound system or radio waves in a SAR system. A processor or processing unit 16 is connected to the image receiver 14 and receives a signal of an image I therefrom. The processor 16 functions generally to perform one or more of the methodologies described herein, or to operate in accordance with machine-readable program instructions that cause the processor to perform one or more steps, processes or methodologies described herein. In one aspect of the system 10 of the preferred embodiment, the processor 16 can include a coherence factor determination module 160 which, for example, is adapted to establish and/or estimate a coherence factor $\alpha$ in accordance with the principles set forth herein.

The processor 16 can also include an image processing module 162 that functions to process an image, via reduction or speckle noise, image segmentation, or any suitable combination thereof for any given, established or estimated coherence factor $\alpha$. Processed images can be directed from the processor 16 to an output device 18, which can include for example a display 20 for rendering the processed image visible to a user. The processor 16, output device 18, or any combination thereof can also function to perform additional processing on the image in addition to speckle noise reduction and segmentation, including for example printing, editing, compression, storage, encryption and the like for further use by one or more users.

Those of skill in the art of image processing will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods described herein can be readily introduced into a number of formats to cause one or more computers, systems, and/or image processors to perform the steps described above. For example, the various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration that is attachable, directly or indirectly to a system or device for receiving raw image data as an input.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The present invention has been described with reference to its preferred embodiments so as to enable any person skilled in the art to make or use the present invention. However, various modifications to these embodiments will be readily apparent to those skilled in the art, and the generic principles defined herein may be applied to other embodiments without departing from the spirit or scope of the invention as set forth in the following claims.

We claim:

1. A method of reducing speckle noise in an image using a processor and a memory, comprising:

(a) receiving an image comprising a plurality of pixels, the plurality of pixels defining a neighborhood system for pixels, wherein the neighborhood system for pixels comprises a first pixel and one or more neighboring pixels;
(b) estimating a coherence factor of the plurality of pixels;
(c) performing a uniformity test on a subset of pixels comprising a portion of the plurality of pixels;
(d) performing an intensity update on a pixel within the subset of pixels in response to the pixel being substantially non-uniform with respect to its neighborhood; and
(e) repeating steps (c) and (d) for substantially all of the plurality of pixels thereby producing a speckle-noise reduced image.

2. The method of claim 1, further comprising the step of performing a noise detection test on the subset of pixels.

3. The method of claim 1, further comprising the step of establishing a noise threshold factor and a pixel threshold factor.

4. The method of claim 1, wherein the step of estimating a coherence factor comprises solving a pseudo-likelihood estimate function.

5. The method of claim 4, wherein the step of solving a pseudo-likelihood estimate function comprises a fixed-point iteration solution method.

6. The method of claim 4, wherein the step of solving a pseudo-likelihood estimate function comprises a secant solution method.

7. The method of claim 4, wherein the step of solving a pseudo-likelihood estimate function comprises Brent's method.

8. The method of claim 1 wherein the intensity update of step (d) comprises a non-linear estimator function.

9. The method of claim 8, wherein the non-linear estimator function comprises one of a convex Gibbs energy function or a Markov random field distribution function of at least a portion of the plurality of pixels.

10. The method of claim 8 wherein the non-linear estimator function receives as inputs an intensity value of at least one neighboring pixel.

11. A non-transitory storage media comprising program instructions that are hardware computer-executable to implement the reduction of speckle noise in an image, the storage media comprising:
program instructions that cause a processor to receive an image comprising a plurality of pixels, the plurality of pixels deigning a neighborhood system for pixels, wherein the neighborhood system for pixels comprises a first pixel and one or more neighboring pixels;
program instructions that cause a processor to estimate a coherence factor of the plurality of pixels;
program instructions that cause a processor to perform a uniformity test on a subset of pixels comprising a portion of the plurality of pixels;
program instructions that cause a processor to perform an intensity update on a pixel within the subset of pixels in response to the pixel being substantially non-uniform with respect to its neighborhood; and
program instructions that cause a processor to repeat the uniformity test and the intensity update for substantially all of the plurality of pixels thereby producing a speckle-noise reduced image.

12. The storage media of claim 11, further comprising program instructions that cause a processor to perform a noise detection test on the subset of pixels.

13. The storage media of claim 11, further comprising program instructions that cause a processor to establish a noise threshold factor and a pixel threshold factor.

14. The storage media of claim 11, wherein the program instructions that cause a processor to estimate a coherence factor comprises program instructions to cause a processor to solve a pseudo-likelihood estimate function.

15. The storage media of claim 14, wherein the program instructions to cause a processor to solve a pseudo-likelihood estimate function comprises program instructions that cause a processor to perform a fixed-point iteration solution method.

16. The storage media of claim 14, wherein the program instructions to cause a processor to solve a pseudo-likelihood estimate function comprises program instructions that cause a processor to perform a secant solution method.

17. The storage media of claim 14, wherein the program instructions to cause a processor to solve a pseudo-likelihood estimate function comprises program instructions that cause a processor to perform Brent's method.

18. The storage media of claim 11 wherein the program instructions to cause a processor to perform an intensity update comprises program instructions that cause a processor to perform a non-linear estimator function.

19. The storage media of claim 18, wherein the non-linear estimator function comprises program instructions that cause a processor to perform one of a convex Gibbs energy function or a Markov random field distribution function of at least a portion of the plurality of pixels.

20. The storage media of claim 18, wherein the non-linear estimator function receives as inputs an intensity value of at least one neighboring pixel.

21. A system for reducing speckle noise in an image comprising:
a processor adapted to:
receive an image comprising a plurality of pixels, the plurality of pixels defining a neighborhood system for pixels, wherein the neighborhood system for pixels comprises a first pixel and one or more neighboring pixels;
estimate a coherence factor of the plurality of pixels;
perform a uniformity test on a subset of pixels comprising a portion of the plurality of pixels;
perform an intensity update on a pixel within the subset of pixels in response to the pixel being substantially non-uniform with respect to its neighborhood; and
generate a speckle reduced image.

22. The system of claim 21, further comprising an imaging device connected to the processor.

23. The system of claim 21, further comprising a display apparatus connected to the processor.

* * * * *